J. B. SMITH.
LISTER ATTACHMENT.
APPLICATION FILED MAR. 1, 1918.

1,320,285.

Patented Oct. 28, 1919.
2 SHEETS—SHEET 1.

Witnesses
J. T. L. Wright

Inventor
J. B. Smith
By Victor J. Evans
Attorney

J. B. SMITH.
LISTER ATTACHMENT.
APPLICATION FILED MAR. 1, 1918.
1,320,285.
Patented Oct. 28, 1919.
2 SHEETS—SHEET 2.
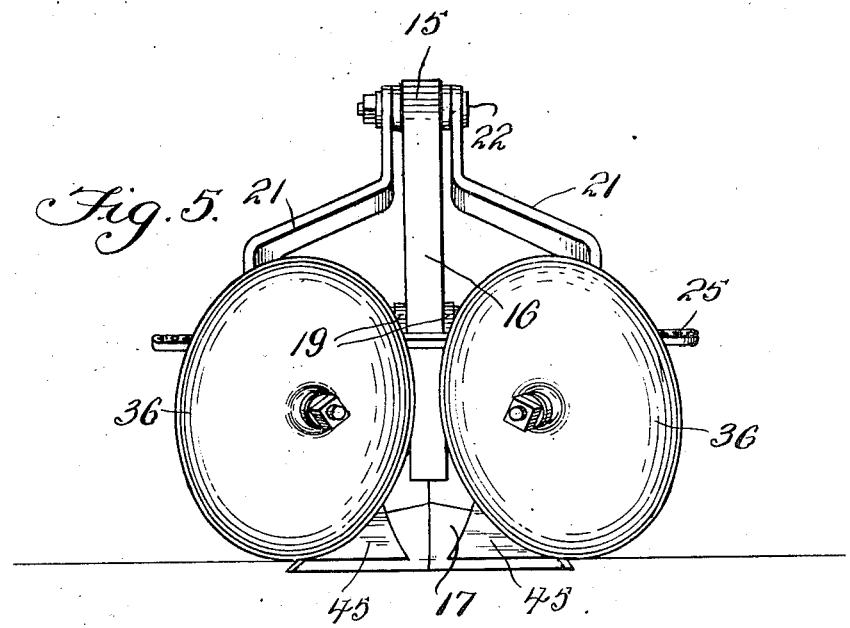
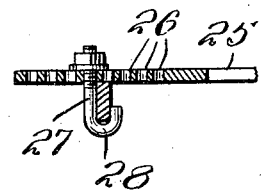
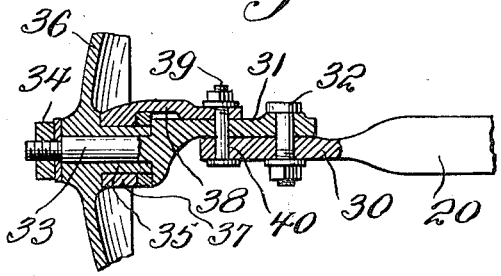
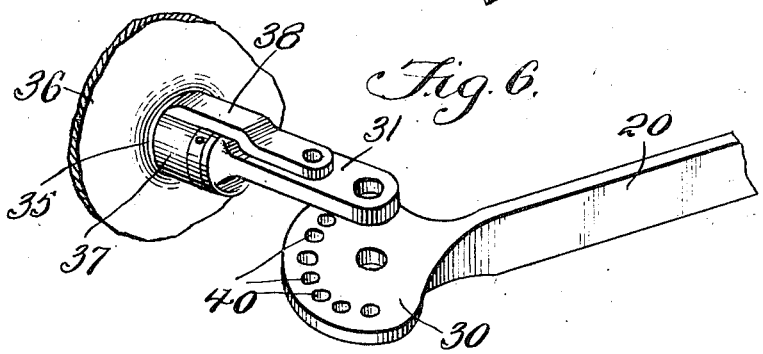
Inventor
J. B. Smith
By Victor J. Evans
Attorney
Witnesses

UNITED STATES PATENT OFFICE.

JESSE B. SMITH, OF CHEYENNE, WYOMING.

LISTER ATTACHMENT.

1,320,285.  Specification of Letters Patent.  Patented Oct. 28, 1919.

Application filed March 1, 1918. Serial No. 219,815.

*To all whom it may concern:*

Be it known that I, JESSE B. SMITH, a citizen of the United States, residing at Cheyenne, in the county of Laramie and State of Wyoming, have invented new and useful Improvements in Lister Attachments, of which the following is a specification.

This invention relates to a disk attachment for listers.

In listing corn the seed is deposited in the bottom of a ditch or furrow made by a listing plow. The ditch made by the ordinary listing plow is too narrow to give free access of sunlight to the germinating or growing corn. The listing plow, also, while it turns the sod, fails to cut the roots of weeds and grasses, permitting the latter to grow luxuriantly, interfering with the growth of the corn, and necessitating cultivation within a week or ten days after planting.

My invention has for its object to produce a simple and improved disk attachment which may be readily applied to and used in connection with an ordinary listing plow, and which, by cutting the edges of the ditch, will increase the width of the same and also cut the grass and weed roots at the time of planting, thereby dispensing with the necessity of cultivation within a very short time after planting.

A further object of the invention is to produce a simple and improved disk attachment for listers which may be readily mounted in position for operation and which will permit any requisite adjustment of the disks.

A further object of the invention is to produce a simple and improved disk attachment for listers, the same including disk carrying bars which are mounted adjustably to permit the disks to be raised and lowered, said adjustment including also covering bars which are mounted adjustably with respect to said disk carrying bars.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Fig. 3 is a transverse sectional detail view showing one of the side bars or beams as properly connected to the cross bar.

Fig. 4 is a longitudinal sectional detail view taken through one of the disks and its supporting means.

Fig. 5 is a rear elevation of the disk carrying frame, detached.

Fig. 6 is a perspective view showing one of the disks and the supporting means therefor detached and separated.

Corresponding parts in the several figures are denoted by like characters of reference.

Figure 1:
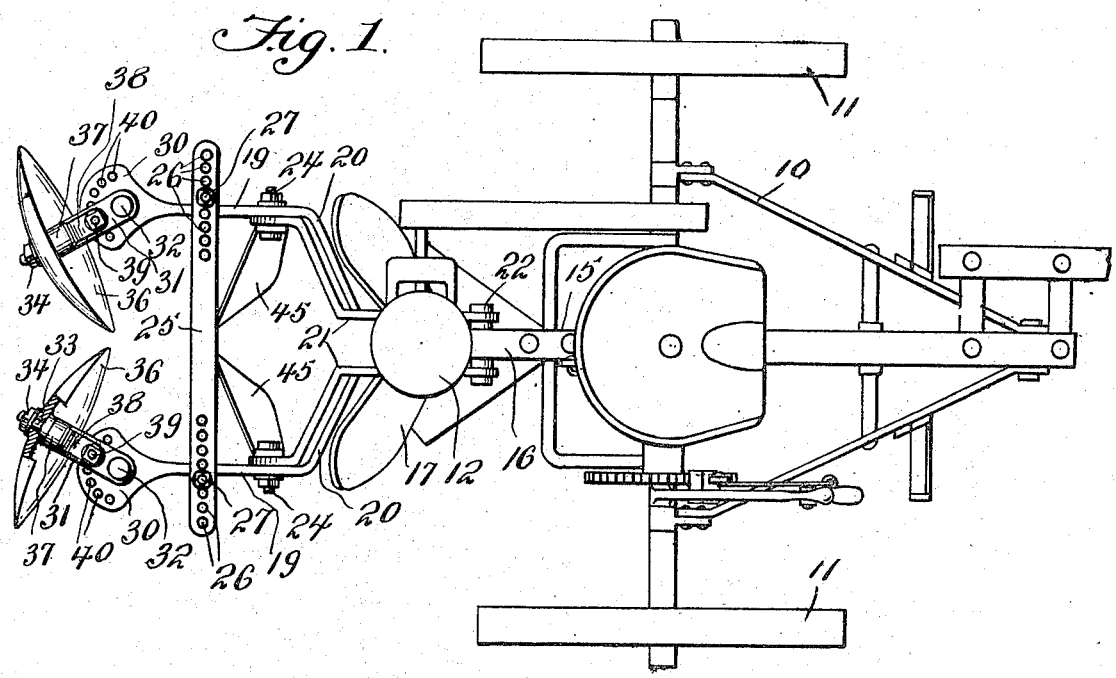
Figure 1 is a top plan view showing the improved disk attachment applied to a riding lister.
Figure 2:
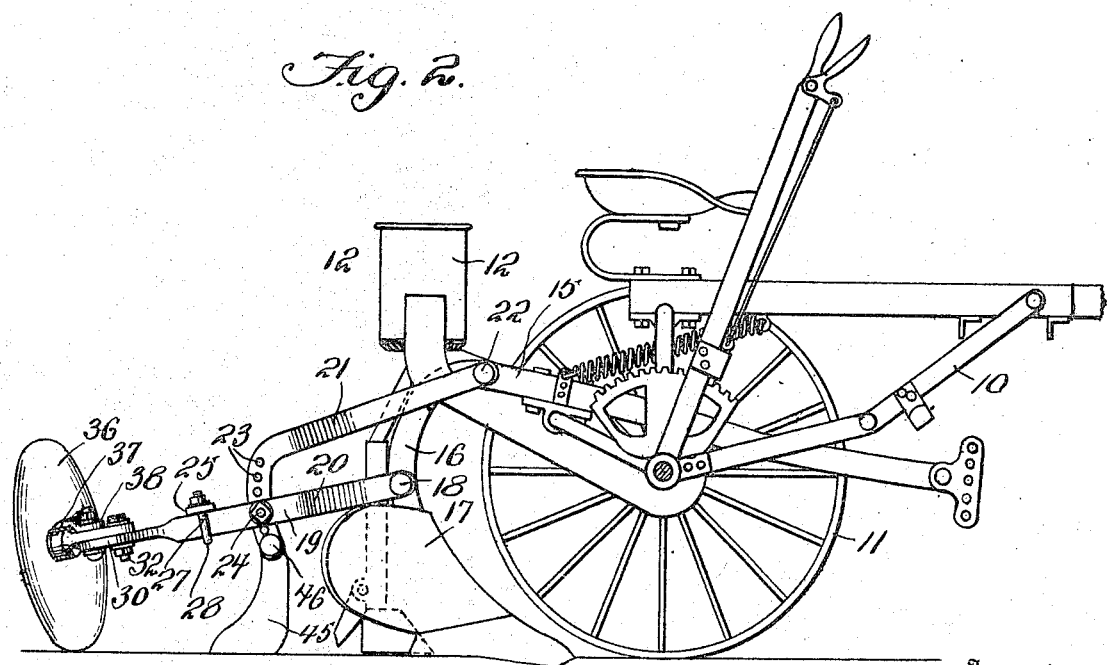
Fig. 2 is a side elevation of the same.

The invention has been shown applied to an ordinary riding lister, the same being conventionally shown, and of which 10 designates the frame, 11 the wheels, 12 the seed box, 15 the beam, 16 the standard and 17 the plow body. The standard 16 is transversely apertured for the passage of a bolt or pivot member 18 on which are mounted the forward ends of two beams or side bars 19, said side bars being provided intermediate the ends thereof with offsets 20 whereby the rearward ends of said side bars are spaced apart. The side bars are connected with the upper portion of the standard 16 by braces 21 which are connected at their upper ends with the standard by a bolt or fastening member 22. The braces 21 are provided near their lower ends with several apertures 23 for the passage of bolts 24 whereby they are connected with the side bars 19 in an adjustable manner which permits the angle of the side bars with respect to the standard to be varied, thereby enabling the rearward ends of the side bars to be raised or lowered with respect to the lister.

25 is a cross bar which is provided near each end thereof with a plurality of apertures 26 for the passage of bolts 27 provided at their lower ends with hooks 28 that engage the side bars. The side bars are in this manner braced and sustained in relation to each other. It will also be seen that by shifting the position of the hook bolts 27, the distance between the free rearward ends of the side bars may be varied, it being understood that the said side bars are constructed of material sufficiently resilient to enable them to be bent toward or apart from each other, as occasion may require.

Each side bar 19 is provided at its rearward end with a flattened bearing portion 30 on which a plate 31 is pivotally mounted by means of a bolt 32. The plate 31 has a rearwardly extending spindle 33 which is terminally threaded to receive a nut 34. The spindle 33 engages the bearing collar or sleeve 35 of a disk 36 which is secured in position for rotation by the nut 34. The bearing sleeve 35 is surrounded by a collar 37 carried by an arm 38 which is connected with the plate 31 and with the bearing portion 30 of the side bar 19 by a bolt 39, the bearing portion 30 having a plurality of perforations 40 for said bolt, said perforations being arranged in series concentrically with the bolt 32. It will be seen that by shifting the bolt 39 from one to another of the perforations 40 the angular position of the disk with relation to the side bar 19 may be varied.

The seed tripping mechanism which includes the seed box or hopper, shown at 12, may be of any well known construction. Connected adjustably with the braces 21 are covering bars, shown at 45, which serve to cover the seed that is being deposited in the bottom of the furrow made by the plow. The braces 21 have each been shown as provided with perforations 23 for the passage of the bolt 24 whereby each brace is connected with one of the disk carrying bars or beams 19. A second bolt 46 is provided for each covering bar 45, the bolts 24 and 46 serving to support the covering bars in an adjustable manner, as will be readily understood. The covering bars are curved inwardly at their lower ends so as to throw the dirt over the seed in the form of a ridge. Trenches will thus be formed adjacent to the sides of such ridge which will permit the excess of water to drain from the furrow in case of heavy rains, thereby to a great extent avoiding the possibility of the seed being washed from the ground.

It will be readily seen that when an attachment constructed as herein described is mounted on a lister, the disks 36 may be adjusted so as to trim the edges of the ditch that is being cut, thereby not only increasing the width of the ditch, but also, and what is just as important, cutting the roots of grasses and weeds growing adjacent to the ditch where sod has been turned by the action of the listing plow. A very thorough and useful operation is thus performed at the time of planting when it is of the greatest importance to destroy the weeds and grasses growing in proximity to the corn, and practically dispensing with the necessity for what is usually known as first cultivation, within a short time after planting. By increasing the width of the ditch, sunlight will be freely admitted to the germinating and sprouting corn, promoting the rapid and healthy growth thereof. The invention is simple in construction, easily applied or installed, and it performs a function which could not be performed by merely increasing the width of the listing plow, and that without materially increasing the draft on the plow.

Having described the invention, what is claimed as new is:

1. The combination in a lister, of an upwardly and forwardly extending standard, rearwardly extending side bars connected with the standard and provided intermediate their ends with offsets whereby the rearward portions of said side bars are spaced apart, disks carried at the rear ends of said side bars, rearwardly extending braces connected at their forward ends with the standard at a point above and in advance of the point of connection of the side bars thereto and provided intermediate their ends with offsets whereby the rearward portions thereof are spaced apart and also provided with downwardly directed terminals on said rearward portions, and means adjustably connecting said terminals with the rearward portions of the side bars.

2. The combination in a lister, of an upwardly and forwardly extending standard, rearwardly extending side bars connected with the standard and provided intermediate their ends with offsets whereby the rearward portions of said side bars are spaced apart, disks carried at the rear ends of said side bars, rearwardly extending braces connected at their forward ends with the standard at a point above and in advance of the point of connection of the side bars thereto and provided intermediate their ends with offsets whereby the rearward portions thereof are spaced apart and also provided with downwardly directed terminals on said rearward portions, means adjustably connecting said terminals with the rearward portions of the side bars, and means for securing the rearward portions of the side bars in spaced relation and for varying the distance between said portions, said means including an apertured cross-bar and hook bolts engaging the side-bars and detachably secured in some of the apertures of the cross-bar.

3. The combination in a lister, of an upwardly and forwardly extending standard, rearwardly extending side bars connected with the standard and provided intermediate their ends with offsets whereby the rearward portions of said side bars are spaced apart, disks carried at the rear ends of said side bars, rearwardly extending braces connected at their forward ends with the standard at a point above and in advance of the point of connection of the side bars thereto and provided intermediate their ends with offsets whereby the rearward portions thereof are spaced apart and also provided with downwardly directed terminals on said rearward portions, means adjustably connecting said terminals with the rearward portions of the side bars, means for spacing and varying the distance between the rearward portions of the side bars, covering bars carried by the rearward portions of the side bars and spaced in front of the disks, and a plow on the standard and arranged in advance of the space between the covering bars.

4. A lister including a standard, rearwardly extending side bars connected with the standard, braces extending from the standard to the side bars each of said braces having a plurality of perforations, bolts connecting said braces with the side bars, covering bars mounted on the bolts and auxiliary bolts extending through and connecting the covering bars and braces.

5. The combination of a flat bearing portion having a plurality of perforations, a plate pivoted on said portion and having a spindle, a disk having a sleeve mounted on said spindle, a collar surrounding the sleeve and having an arm, and a bolt extending through the arm and one of said perforations of the bearing portion.

6. The combination in a lister, of side bars spaced apart, disks carried at their centers at the rear ends of said side bars and covering bars carried by the side bars and spaced in front of the disks.

7. The combination in a lister, of side bars spaced apart, disks carried at their centers at the rear ends of said side bars, and covering bars carried by the side bars and spaced in front of the disks and a plow with which said side bars are connected, said plow arranged in advance of the space between the covering bars.

In testimony whereof I affix my signature.

JESSE B. SMITH.